US012762598B2

(12) United States Patent
Gu et al.

(10) Patent No.: US 12,762,598 B2
(45) Date of Patent: Oct. 13, 2026

(54) TRAINING DATA GENERATION BY BUCKETING USERS BASED ON OUTPUT OF A CONTEXTUAL BANDIT MODEL

(71) Applicant: Maplebear Inc., San Francisco, CA (US)

(72) Inventors: Jonathan Gu, San Francisco, CA (US); Bo Xiao, Hillsborough, CA (US); Yixi Ouyang, Milpitas, CA (US); Jennifer Wiersema, Oakland, CA (US); Ying Li, San Francisco, CA (US); Matias Cersosimo, Stanford, CA (US); Rustin Partow, San Francisco, CA (US); Levi Boxell, Brownsburg, IN (US); Tilman Drerup, Palo Alto, CA (US); Oleksii Stepanian, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 187 days.

(21) Appl. No.: 18/393,380

(22) Filed: Dec. 21, 2023

(65) Prior Publication Data

US 2025/0209511 A1 Jun. 26, 2025

(51) Int. Cl.

| | |
|---|---|
| ***G06Q 30/00*** | (2023.01) |
| ***G06Q 30/0242*** | (2023.01) |
| ***G06Q 30/0601*** | (2023.01) |

(52) U.S. Cl.

CPC ..... *G06Q 30/0631* (2013.01); *G06Q 30/0245* (2013.01)

(58) Field of Classification Search

CPC ....................... G06Q 30/0631; G06Q 30/0245

See application file for complete search history.

(56) References Cited

U.S. PATENT DOCUMENTS

| | | | | |
|---|---|---|---|---|
| 2014/0129332 | A1 | 5/2014 | Ramer et al. | |
| 2014/0157306 | A1 | 6/2014 | Deo et al. | |
| 2020/0288204 | A1 | 9/2020 | Duersch et al. | |
| 2020/0396497 | A1* | 12/2020 | Liu .................... | H04N 21/4826 |
| 2021/0142387 | A1 | 5/2021 | Gupta et al. | |

OTHER PUBLICATIONS

S. Bansal, C. Gupta and A. Sinha, “Clickstream & behavioral analysis with context awareness for e-commercial applications,” 2017 Tenth International Conference on Contemporary Computing (IC3), Noida, India, 2017, pp. 1-6, doi: 10.1109/IC3.2017.8284328. (Year: 2017).*

PCT International Search Report and Written Opinion, PCT Application No. PCT/US2023/85805, Apr. 23, 2024, 9 pages.

* cited by examiner

*Primary Examiner* — Anand Loharikar

(74) *Attorney, Agent, or Firm* — Fenwick & West LLP

(57) ABSTRACT

A ranking computer model is trained based on grouping a collection of users of an online system into different buckets based on intended likelihoods of presenting a set of content items to the collection of users, wherein a contextual bandit model is employed to compute the intended likelihoods. The online system applies the ranking computer model to generate, based on user data for a user of the online system and contextual data associated with a current session of the user, a ranking score for each content item in a set of content items. The online system selects, based on the ranking score for each content item, one or more content items from the set of content items. The online system causes a device associated with the user to display a user interface with the one or more content items for recommendation to the user.

18 Claims, 6 Drawing Sheets

TRAINING DATA GENERATION BY BUCKETING USERS BASED ON OUTPUT OF A CONTEXTUAL BANDIT MODEL

CROSS REFERENCE TO RELATED APPLICATIONS

Commonly owned U.S. application Ser. No. 18/393,338, entitled "Generating Training Data for Bundle Scoring Machine-Learning Model Based on Content Selection Models," and filed on Dec. 21, 2023.

Commonly owned U.S. application Ser. No. 18/393,349, entitled "Counterfactual Policy Evaluation of Model Performance," and filed on Dec. 21, 2023.

BACKGROUND

An online system provides content to users with which users can interact. Present-day online systems utilize machine-learning computer models to select content items to present to users. The online systems can train these machine-learning models based on data describing user interactions with the online system's content. To ensure an appropriate balance between exploration and exploitation in selecting contents, the online systems can use a contextual bandit model during a training phase for a machine-learning model. A contextual bandit model uses randomness to select content items to present during a training phase by computing probabilities for each of a set of content items and selecting which content items to present to a collection of eligible users of an online system based on the computed probabilities. A contextual bandit model also considers other information when selecting content to present to users, such as characteristics of the user or the content items to be presented. Thus, different users of the online system may be assigned different likelihoods of receiving content items that are being tested by the online system.

However, due to various real time variables in relation to the users and the online system, the computed probabilities can differ from probabilities of a particular user actually receiving one or more content items. For example, a contextual bandit model may assign the likelihoods for a user to receive a content item at the beginning of a testing period. However, each content item may have certain eligibility criteria to be met for a user to be presented with the content item, and the online system may only be able to determine whether a user is eligible at the time when the content item is to be presented to the user. Thus, the computed rates at which a user should receive each of the set of content items may differ from the actual rate at which the user would receive each of the content items.

These differences between the computed probabilities and the actual (or real time) probabilities negatively affect the ability of the online system to balance exploring which content items are most effective for encouraging user interactions with generating as much training data as possible for the most effective content items. These differences are difficult to detect because few, if any, users receive the same computed probabilities from a contextual bandit model, which means that there are generally insufficient data points to determine whether the actual rates at which users are receiving each content item is statistically different from the intended rates. Hence, there is a technical problem of improving computation of real time probabilities for presenting content items to users of the online system that sometimes the traditional machine-learning models cannot provide. Therefore, there is a need for a new approach to generating training data for a machine-learning model approach when computing probabilities for presenting content items to users of the online system and determining, based on the computed probabilities, which content item would be presented to which user of the online system.

SUMMARY

Embodiments of the present disclosure are directed to training a computer model based on grouping a collection of users of an online system into different buckets based on intended likelihoods for presenting a set of content items to the collection of users, and utilizing the trained computer model to select one or more content items for recommendation to a particular user of the online system. The computer model is trained to accurately evaluate selection of content items for presentation to individual users by taking into account any real time variation in relation to one or more eligibility criteria in relation to each user to receive the content items.

In accordance with one or more aspects of the disclosure, the online system accesses a contextual bandit computer model of the online system, wherein the contextual bandit computer model is trained to compute a likelihood of presenting each content item in a set of content items to a respective user of a plurality of users of the online system. The online system applies the contextual bandit computer model to compute, based at least in part on user data for each of the plurality of users, the likelihood of presenting each content item to the respective user. The online system groups, based at least in part on the likelihood of each content item in the set of content items being presented to the respective user, each of the plurality of users into a corresponding bucket of a plurality of buckets, the corresponding bucket being associated with an intended rate of presenting each content item in the set of content items to the plurality of users. The online system selects, based at least in part on the intended rate and a first set of features of the plurality of users, a corresponding content item from the set of content items for presentation to a first set of users of the plurality of users. Upon presentation of the corresponding content item to the first set of users, the online system obtains information about a first rate of presenting the corresponding content item to the plurality of users. The online system adjusts, based at least in part on the first rate, a value of the intended rate. The online system generates, based at least in part on the adjusted value of the intended rate of presenting each content item in the set of content items to the plurality of users, training data for a ranking computer model of the online system. The online system trains, using the generated training data, a set of parameters of the ranking computer model. The online system accesses the ranking computer model, wherein the ranking computer model is trained to generate a ranking score for each content item in the set of content items. The online system applies the ranking computer model to generate, based at least in part on user data for a user of the online system and contextual data associated with a current session of the user, the ranking score for each content item in the set of content items. The online system selects, based on the ranking score for each content item in the set of content items, one or more content items from the set of the content items. The online system causes a device associated with the user to display a user interface with the one or more content items for recommendation to the user.

By grouping users into buckets based on the computed probabilities by the contextual bandit model, the online system can create statistically significant samples of the actual rates at which users are being presented with content items. The online system can thereby more effectively detect whether downstream effects are causing statistically significant impacts on the rates at which users are receiving content items. Furthermore, since the online system can adjust the rates at which users in a bucket receive content items to account for these downstream effects, the online system can thereby automatically ensure that effective training data is captured for a machine-learning model.

DETAILED DESCRIPTION

Figure 1:
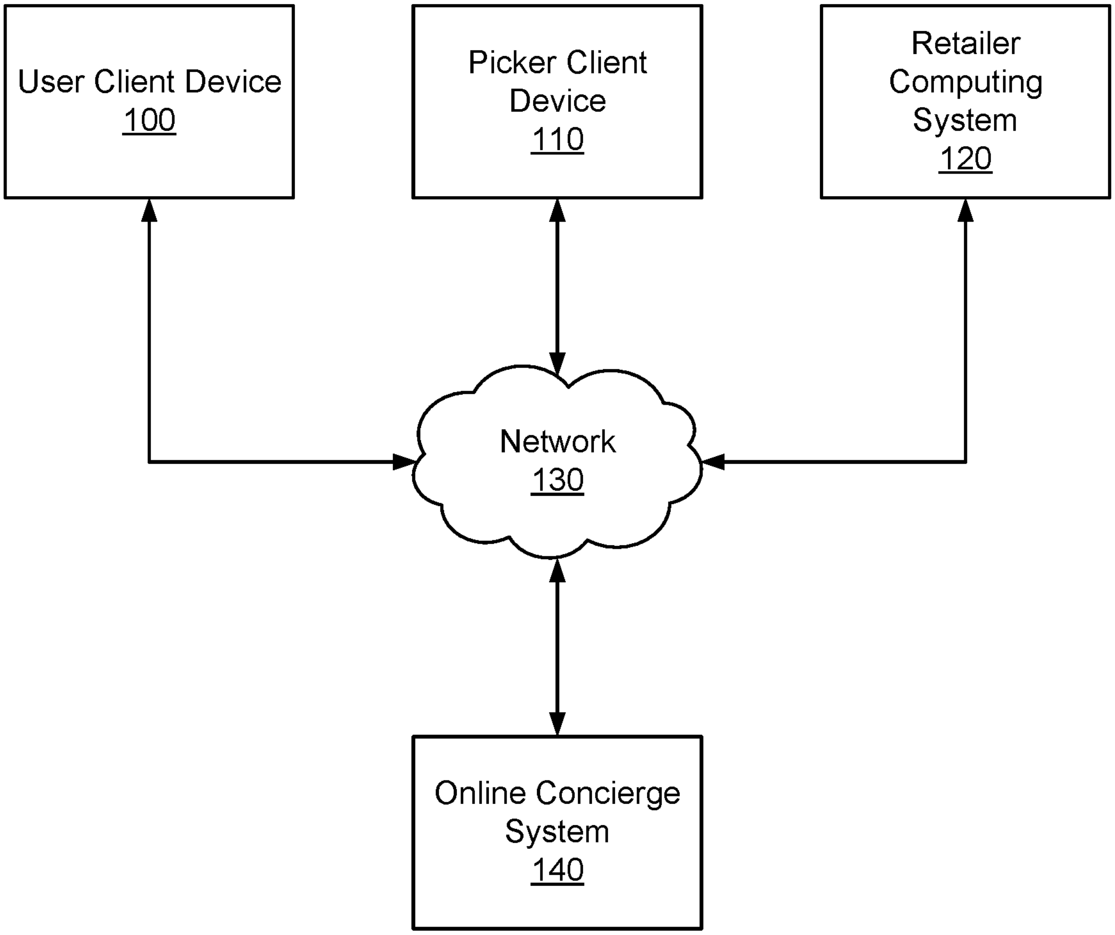
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from the user client device 100 through the network 130. The online concierge system 140 selects a picker to service the user's order and transmits the order to the picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

The online concierge system 140 provides content items to users of the online concierge system 140. In one or more embodiments, the content items are offers for the users to get various reward credits if the users perform certain actions, e.g., order items at specific retailers, order specific types of items, place orders of specific monetary values, etc. In one or more other embodiments, the content items can be any content that the users of the online concierge system 140 can interact with, e.g., one or more products recommended to a specific user of the online concierge system 140, videos of recommended products that the user can view and act upon them, images of recommended products that the user can view and act upon them, etc.

During a testing period (e.g., training phase), the online concierge system 140 may utilize a contextual bandit model (e.g., machine-learning computer model) to compute probabilities (i.e., likelihoods or rates) that one or more content items from a set of content items will be presented to each user of a collection of eligible users of the online concierge system 140. The online concierge system 140 then uses the computed probabilities to determine which one or more content items (if any) from the set of content items would be presented to each eligible user. Each content item may be associated with one or more eligibility criteria that each user in the collection of users needs to satisfy. However, the eligibility of each user to receive a content item from the set of content items may dynamically change over time (e.g., during a time period between the computation of probabilities of presenting content items and actual serving of content items). This can impact an actual (or real time) probability of each user in the collection of users receiving the content item.

To identify and quantify how the eligibility criteria are impacting actual probabilities for each user of receiving content items, the online concierge system 140 groups the collection of eligible users based on their computed probabilities for each content item of the set of content items and assigns users within each group (or bucket) the same intended probability for each content item. The online concierge system 140 can then adjust the probabilities associated with each bucket so that the actual probabilities of presenting content items match the intended probabilities. The online concierge system 140 may train a ranking model (e.g., machine-learning computer model) of the online concierge system 140 using training data generated based on information about the adjusted probabilities and/or information about interaction of each user with one or more presented content items. The online concierge system 140 may utilize the trained ranking model to rank a set of content items for a specific user, where one or more highest ranked content items are selected for recommendation to the user. The online concierge system 140 is described in further detail below with regards to FIG. 2.

Figure 2:
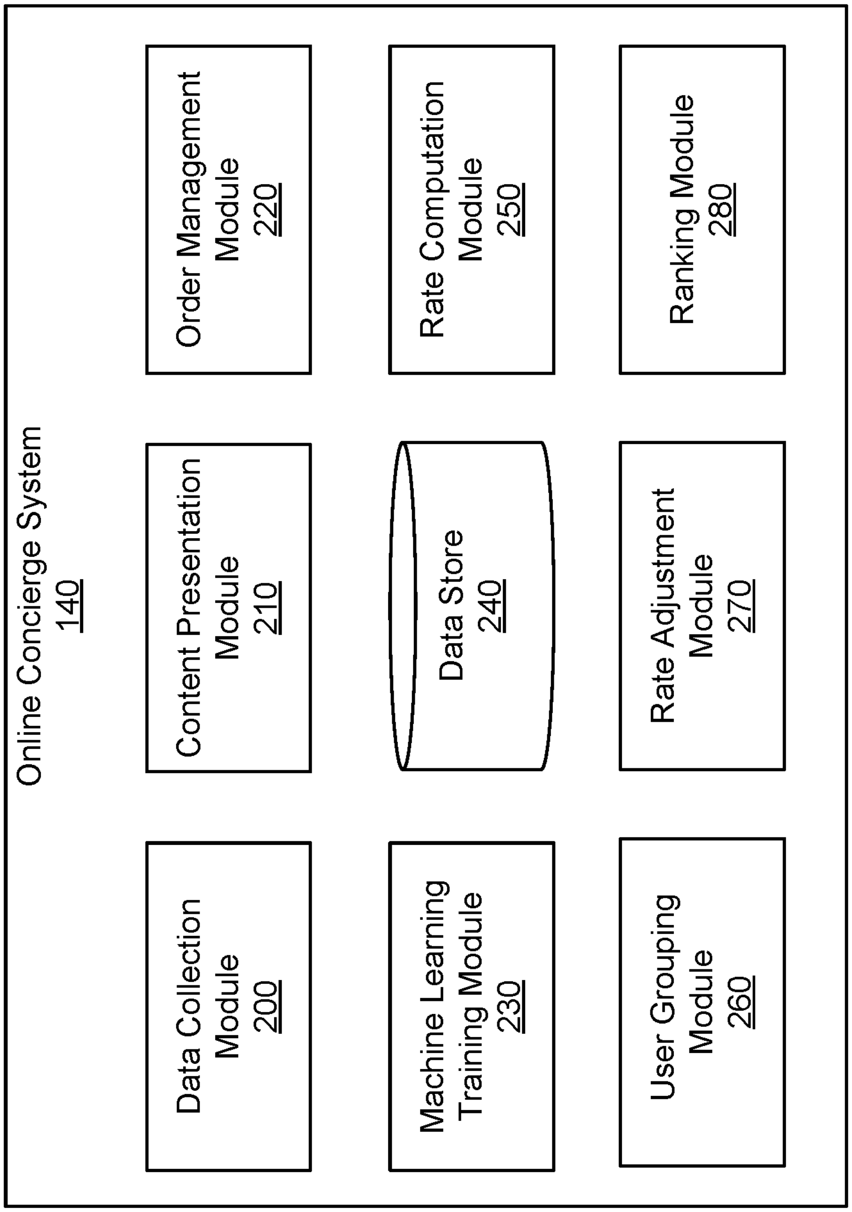
FIG. 2 illustrates an example system architecture for an online concierge system, in accordance with one or more embodiments.

FIG. 2 illustrates an example system architecture for the online concierge system 140, in accordance with some embodiments. The system architecture illustrated in FIG. 2 includes a data collection module 200, a content presentation module 210, an order management module 220, a machine-learning training module 230, a data store 240, a rate computation module 250, a user grouping module 260, a rate adjustment module 270, and a ranking module 280. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. For example, the data collection module 200 may collect the user data that include a user's name, address, shopping preferences, favorite items, or stored payment instruments. The data collection module 200 may collect the user data that also include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The data collection module 200 may collect the item data that include item identifiers for items that are available and may include quantities of items associated with each item identifier. Additionally, the data collection module 200 may collect the item data that also include attributes of items such as the size, color, weight, stock keeping unit (SKU), or serial number for the item. The data collection module 200 may collect the item data that further include purchasing rules associated with each item, if they exist. For example, age-restricted items such as alcohol and tobacco are flagged accordingly in the item data. The data collection module 200 may collect the item data that also include information that is useful for predicting the availability of items in retailer locations. For example, the data collection module 200 may collect the item data that include, for each item-retailer combination (a particular item at a particular warehouse), a time that the item was last found, a time that the item was last not found (a picker looked for the item but could not find it), the rate at which the item is found, or the popularity of the item. The data collection module 200 may collect the item data from the retailer computing system 120, the picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the data collection module 200 may collect the picker data for a picker that include the picker's name, the picker's location, how often the picker has serviced orders for the online concierge system 140, a user rating for the picker, which retailers the picker has collected items at, or the picker's previous shopping history. Additionally, the data collection module 200 may collect the picker data that include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects the picker data from sensors of the picker client device 110 or from the picker's interactions with the online concierge system 140.

Additionally, the data collection module 200 collects order data, which is information or data that describes characteristics of an order. For example, the data collection module 200 may collect the order data that include item data for items that are included in the order, a delivery location for the order, a user associated with the order, a retailer location from which the user wants the ordered items collected, or a timeframe within which the user wants the order delivered. Also, the data collection module 200 may collect the order data that further include information describing how the order was serviced, such as which picker serviced the order, when the order was delivered, or a rating that the user gave the delivery of the order. In some embodiments, the data collection module 200 collects the order data that include user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from the user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use the user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may re-train the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The rate computation module 250 may access (e.g., during a testing period) a contextual bandit computer model (e.g., machine-learning computer model) trained to compute a probability (i.e., likelihood or rate) for each content item in a set of content items associated with the online concierge system 140 of being presented to a respective user of a collection of users of the online concierge system 140. The collection of users may correspond to a subset of users of the online concierge system 140 that are eligible for receiving any content item from the set of content items. The rate computation module 250 may deploy (e.g., during the testing period) the contextual bandit computer model to run a machine-learning algorithm to compute, based at least in part on a shopping history of each of the plurality of users (e.g., as available at the data store 240), the probability (i.e., likelihood or rate) of each content item being presented to the respective user. The contextual bandit computer model may represent a statistical model that models the sequential choice between several actions generating different rewards. A set of parameters for the contextual bandit computer model may be stored at one or more non-transitory computer-readable media of the probability computation module 250. Alternatively, the set of parameters for the contextual bandit computer model may be stored at one or more non-transitory computer-readable media of the data store 240. Details about the testing period during which the rate computation module 250 deploys the contextual bandit computer model are described in further detail below with regards to FIG. 3A.

Figure 3A:
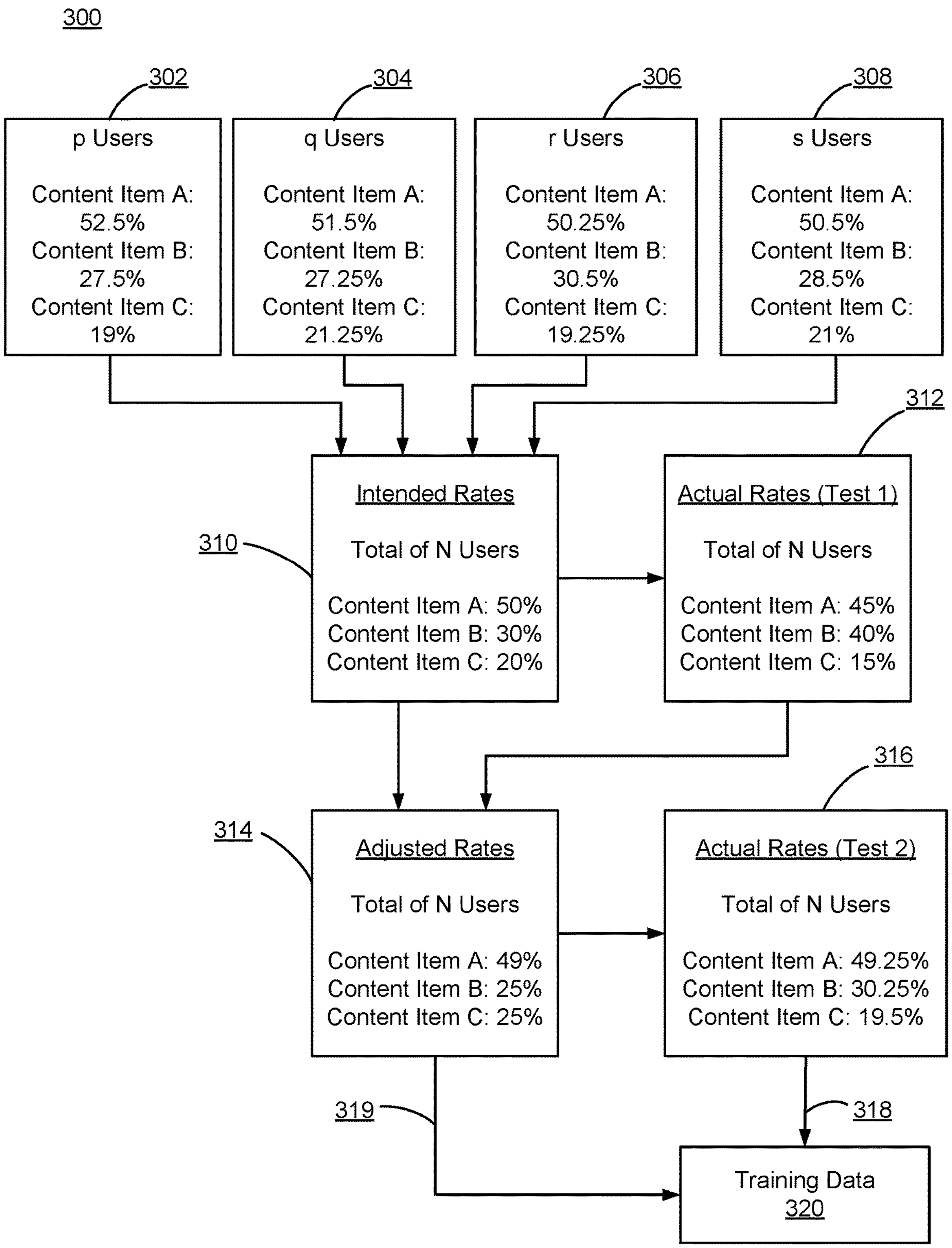
FIG. 3A illustrates an example flow diagram of generating data for training a computer model of an online concierge system, in accordance with one or more embodiments.

FIG. 3A illustrates an example flow diagram 300 of generating data for training a ranking computer model of the online concierge system 140, in accordance with one or more embodiments. The probability computation module 250 may deploy the contextual bandit computer model to compute, for each user in the collection of users (e.g., based on their shopping history), a probability of receiving a respective content item in the set of content items. As shown in FIG. 3A, the contextual bandit computer model may compute, at 302, that p users (e.g., $p \geq 1$) would receive a content item A with 52.5% probability (or rate), a content item B with 27.5% probability and a content item C with 19% probability, where the set of content items include content items A, B and C. Similarly, the contextual bandit computer model may compute, at 304, that q users (e.g., $q \geq 1$) would receive the content item A with 51.5% probability (or rate), the content item B with 27.25% probability and the content item C with 21.25% probability. At 306, the contextual bandit computer model may compute that r users (e.g., $r \geq 1$) would receive the content item A with 50.25% probability (or rate), the content item B with 30.5% probability and the content item C with 19.25% probability. And, at 308, the contextual bandit computer model may compute that s users (e.g., $s \geq 1$) would receive the content item A with 50.5% probability (or rate), the content item B with 28.5% probability and the content item C with 21% probability.

The probabilities of assigning content items to users may be computed by the contextual bandit computer model (e.g., at the steps 302, 304, 306, 308 in FIG. 3A) before each content item is actually served to a corresponding user.

Additionally, each content item may be associated with one or more eligibility criteria or other filtering that can vary in real time. This can cause a difference between intended probabilities and actual probabilities that users receive content items. For example, the content item A may only be presented to a subset of users who are registered with the online concierge system 140 as prime members, and the content item A would not be applied to those users who are not registered as prime members. However, during a time period between the computation of probabilities of assigning content items to the collection of users and actual serving of a content item to a user, that particular user may not be registered as a prime member anymore. Because of that, the actual rate at which the user receives the content item A may be less than the initially computed probability of 52.5% (e.g., as computed by the contextual bandit computer model at the step 302). Similarly, the content item B may only be presented to a subset of users who are purchasing deli counter foods, and the content item B would not be applied to users who do not purchase deli counter foods. However, during the testing period including the time period before serving the content item B, a particular user may buy less deli food items, so the actual rate at which that user receives the content item B should be less than the initially computed rate (e.g., as computed by the contextual bandit computer model at the step 302, 304 or 306).

Because each user (or small number of users) has such a specific (and, therefore, mutually different) intended probability for serving a content item, it may be difficult to detect the aforementioned statistical anomalies across multiple users that have different intended probabilities (or rates) for serving the same content item. In order to better identify when the eligibility criteria are statistically impacting the intended probabilities of serving each content item from the set of content items to the collection of users, the user grouping module 260 may be configured to group users into buckets. Each bucket of users may be associated with an intended rate (i.e., probability or likelihood) of assigning the set of content items to that bucket of users, wherein the intended rate may be within a threshold difference from the initial rate computed by the contextual bandit computer model (e.g., at the steps 302, 304, 306, 308 in FIG. 3A). In this manner, by grouping users into corresponding buckets, the sample size of users in each bucket is increased compared to a number of users having the same initial rate of assigning the set of content items. For example, as shown in FIG. 3A, p users with the same initial rates of assigning content items computed at step 302, q users with the same initial rates of assigning content items computed at step 304, r users with the same initial rates of assigning content items computed at step 306, and s users with the same initial rates of assigning content items computed at step 308 may be all grouped by the user grouping module 260 into a single bucket 310 that features intended rates of, e.g., 50% for the content item A, 30% for the content item B and 20% for the content item C for a total of N users, where N=p+q+r+s.

Upon serving the set of content items to corresponding users from the collection of users in accordance with the intended rates, the online concierge system 140 may obtain information about actual rates of serving the set of content items to the corresponding users. Due to the aforementioned real time changes in relation to the eligibility criteria for the collection of users, actual rates of serving the set of content items to the corresponding users may be different from the intended rates. For example, as shown in FIG. 3A, after conducting a test 1 of presenting the set of content items to the corresponding users from the bucket 310 in accordance with the intended rates, the actual rate of serving the content item A is 45%, the actual rate of serving the content item B is 40% and the actual rate of serving the content item C is 15%. Information about the actual rates may be obtained at the step 312, e.g., via the user grouping module 260 or some other module of the online concierge system 140. However, it can be observed that the actual rates obtained at 312 substantially differ (e.g., by an amount larger than a threshold value) from the intended rates associated with the bucket 310.

In order to get the actual rates of serving the set of content items closer to the intended rates, the rate adjustment module 270 may be configured to adjust the intended rates of each bucket of users. As shown in FIG. 3A, the rate adjustment module 270 may adjust, at 314, rates of the bucket 310 so that the content item A is served with the adjusted rate of 49%, the content item B is served with the adjusted rate of 25% and the content item C is served with the adjusted rate of 25%, when considering the total of N users from the collection of users.

Upon serving the set of content items to corresponding users from the collection of users in accordance with the adjusted rates, the online concierge system 140 may obtain information about actual rates of serving the set of content items to the corresponding users. Due to the aforementioned real time changes in relation to the eligibility criteria for the collection of users, actual rates of serving the set of content items to the corresponding users may be different from the adjusted rates. For example, as shown in FIG. 3A, after conducting a test 2 of presenting the set of content items to the corresponding users from the bucket 310 in accordance with the adjusted rates, the actual rate of serving the content item A is 49.25%, the actual rate of serving the content item B is 30.25% and the actual rate of serving the content item C is 19.5%. Information about the actual rates may be obtained at the step 316, e.g., via the user grouping module 260 or some other module of the online concierge system 140. It can be observed that the actual rates obtained at 316 are within the threshold difference (e.g., within 1% difference) from the intended rates of the bucket 310, which was the original goal of the testing process.

In one or more other embodiments (not shown in FIG. 3A), the rate adjustment module 270 may be configured to adjust the intended rates of each bucket of users such that the adjusted intended rates (e.g., adjusted at the step 314) are higher than the intended rates of the bucket 310. The adjusted rates that overcompensate the intended rates may also result into actual rates of serving the set of content items to the corresponding users (e.g., as obtained at the step 316) that are within the threshold difference (e.g., within 1% difference) from the intended rates of the bucket 310. Furthermore, although FIG. 3A shows that two tests are required to achieve actual rates of serving the set of content items within the threshold difference from the intended rates, the process of converging the actual rates of serving the set of content items to the intended rates can be iterative, where a number of required iterations for converging the actual rates within the threshold difference from the intended rates is larger than two.

Responsive to the difference between the actual rates at 316 and the intended rates of the bucket 310 being below the threshold value, the machine-learning training module 230 may collect feedback data 318 with information about engagement of each user in relation to a content item in the set of content items presented to that particular user. Additionally, the machine-learning training module 230 may collect adjusted rates data 319 with information about adjusted values of the intended rates. The feedback data 318 and the adjusted rates data 319 may form training data 320. The machine-learning training module 230 may utilize the training data 320 for training a ranking computer model (e.g., machine-learning computer model) of the online concierge system 140 so that the trained ranking computer model may generate a ranking score for each content item in the set of content items for each individual user. Details about utilizing the trained ranking computer model are described in further detail below with regards to FIG. 3B.

Figure 3B:
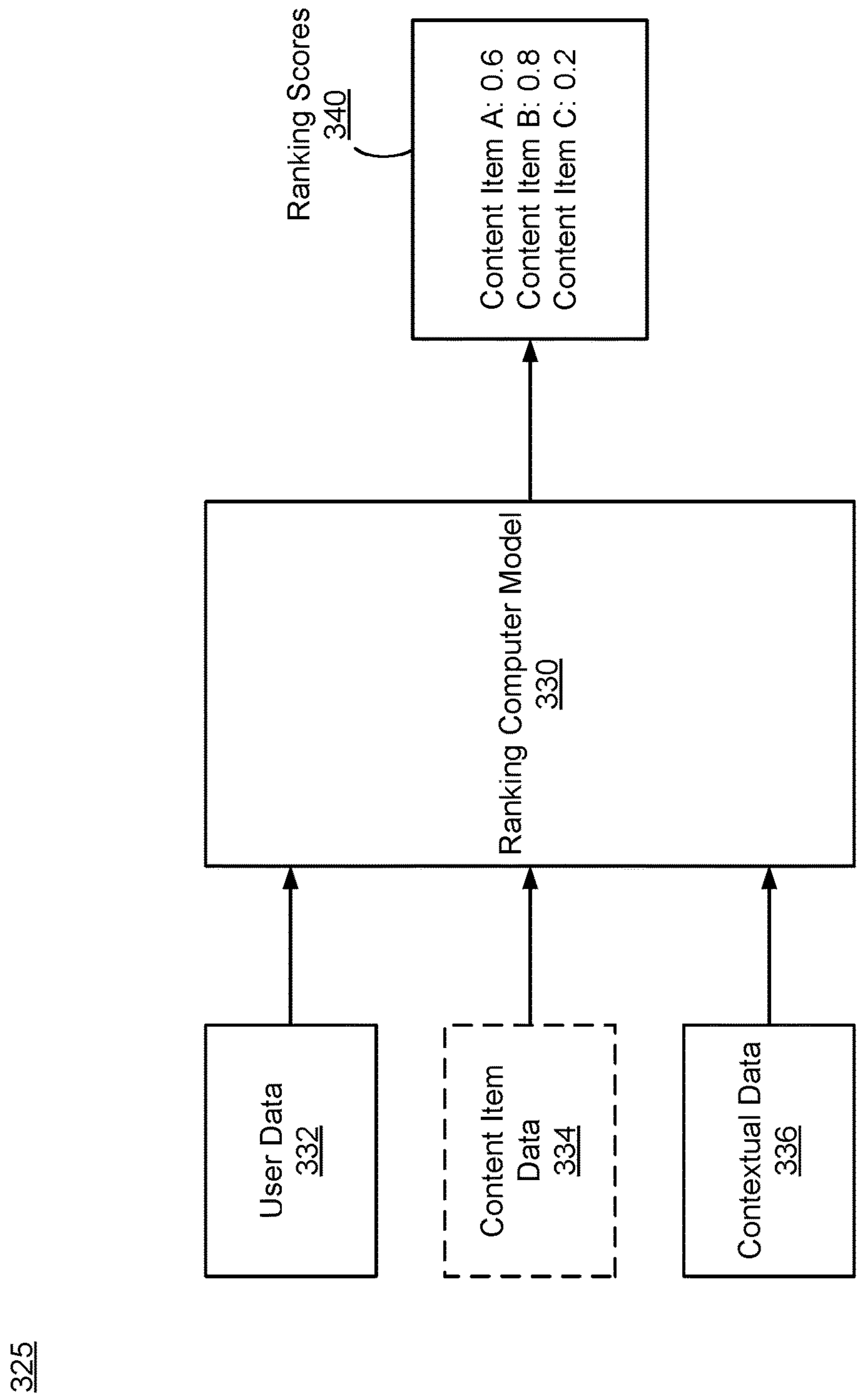
FIG. 3B illustrates an example flow diagram of using a trained computer model for ranking a set of content items for recommendation to a user of an online concierge system.

FIG. 3B illustrates an example flow diagram 325 of using a trained ranking computer model 330 for ranking a set of content items for recommendation to a user of the online concierge system 140. The set of content items may be the same content items used during the testing process of FIG. 3A. Alternatively, the set of content items may be different from the content items used during the testing process of FIG. 3A. Furthermore, the user may not belong to the collection of users that were tested during the testing process of FIG. 3A. Alternatively, the user may belong to the collection of users that were tested during the testing process of FIG. 3A.

The ranking module 280 may access the ranking computer model 330 that is trained to generate a ranking score for each content item in the set of content items. The ranking module 280 may deploy the ranking computer model 330 to run a machine-learning algorithm to generate, based on user data 332 and contextual data 336, the ranking score for each content item in the set of content items. The user data 332 may include information about a shopping history of the user over a defined time period (e.g., as available at the data store 240), and the contextual data 336 may include information about a set of items and/or one or more content items the user interacted with during a current session. The user's interaction with an item may include viewing an item, conversion of an item, or some other type of engagement with an item. Similarly, the user's interaction with a content item may include viewing a content item, accepting an offer associated with the content item, ignoring a content item, or some other type of engagement with a content item. Additionally, the ranking module 280 may provide content item data 334 as an additional input to the ranking computer model 330, where the content item data 334 include information about one or more content items in the set of content items. A set of parameters for the ranking computer model 330 may be stored at one or more non-transitory computer-readable media of the ranking module 280. Alternatively, the set of parameters for the ranking computer model 330 may be stored at one or more non-transitory computer-readable media of the data store 240.

Based on the provided inputs (e.g., the user data 332, the contextual data 336, and optionally the content item data 334), the ranking computer model 330 may compute ranking scores 340 for the set of content items. For example, as shown in FIG. 3B, a ranking score for the content item A is 0.6, a ranking score for the content item B is 0.8 and a ranking score for the content item C is 0.2. The ranking module 280 may select, based on the ranking score for each content item in the set of content items, one or more content items from the set of the content items for recommendation to the user. In one or more embodiments, the ranking module 280 may select a defined number of content items with highest ranking scores. For example, if the defined number of content items is one, the ranking module 280 may only select the content item A for recommendation to the user. In one or more other embodiments, the ranking module 280 may select one or more content items that have a ranking score equal to or larger than a threshold score. For example, if the threshold score is set to 0.6, the ranking module 280 may select the content item A and content item B for recommendation to the user.

The content presentation module 210 may obtain (e.g., from the ranking module 280) the list of one or more content items selected for recommendation to the user. The content presentation module 210 may cause the user client device 100 to display (e.g., before the checkout) a user interface with the list of one or more content items. The user may then utilize an appropriate interface at each of the one or more content items to interact with each content item. In one or more embodiments, the user utilizes the appropriate interface to only view a recommended content item. In one or more other embodiments, the user utilizes the appropriate interface to accept a recommended content item. Alternatively, the user may choose to ignore each recommended content item.

The machine-learning training module 230 may collect information about the user's response to the one or more recommended content items. The information collected by the machine-learning training module 230 may include corresponding engagement information, such as information about the user viewing a recommended content item, information about the user accepting (i.e., converting) a recommended content item, and/or information about the user ignoring a recommended content item. The machine-learning training module 230 may then utilize the collected information to re-train the ranking computer model, i.e., to update the set of parameters of the ranking computer model.

Figure 4:
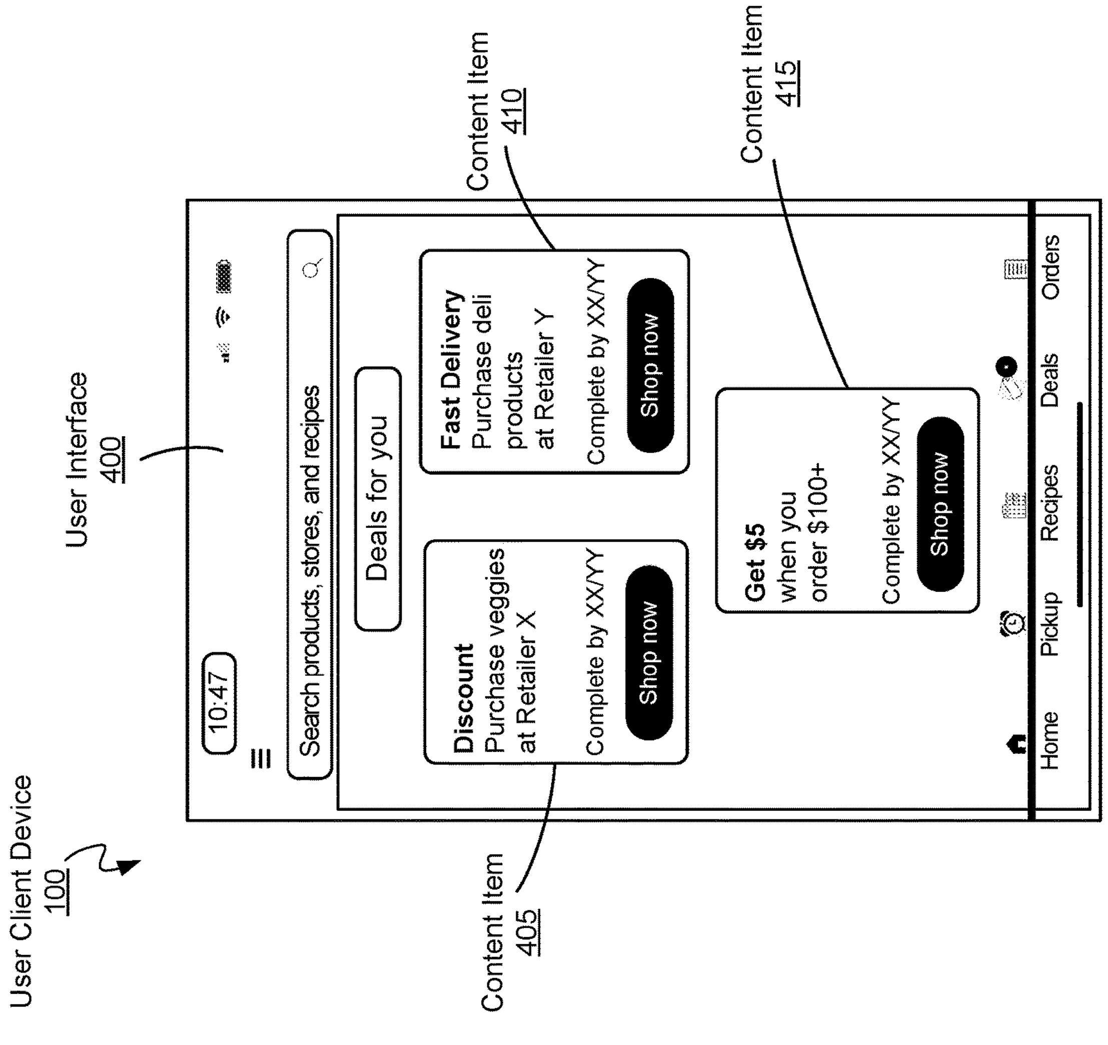
FIG. 4 illustrates an example user interface of a user client device with multiple content items presented to a user of an online concierge system, in accordance with one or more embodiments.

FIG. 4 illustrates an example user interface 400 of the user client device 100 with multiple content items presented to a user of the online concierge system 140, in accordance with one or more embodiments. Upon receiving (e.g., from the ranking module 280) a list of content items selected for recommendation to the user, the content presentation module causes the user client device 100 to display the user interface 400 with content items 405, 410, 415. Although FIG. 4 illustrates the user interface 400 with multiple content items recommended to the user, the user interface 400 may recommend only a single content item to the user. The user interface 400 may be displayed during an ordering session of the user (e.g., before the checkout) during which the user has already included a certain number of items into a shopping cart. Alternatively, the user interface 400 may be displayed at the very beginning of the user's ordering session. The user may utilize appropriate buttons at each recommended content item 405, 410, 415 to engage with any of the recommended content items 405, 410, 415. The user's engagement with any of the content items 405, 410, 415 may include viewing a content item 405, 410, 415, converting a content item 405, 410, 415, sharing a content item 405, 410, 415, or some other type of interaction with a content item 405, 410, 415. Alternatively, the user may continue shopping without engaging with any of the recommended content items 405, 410, 415.

Figure 5:
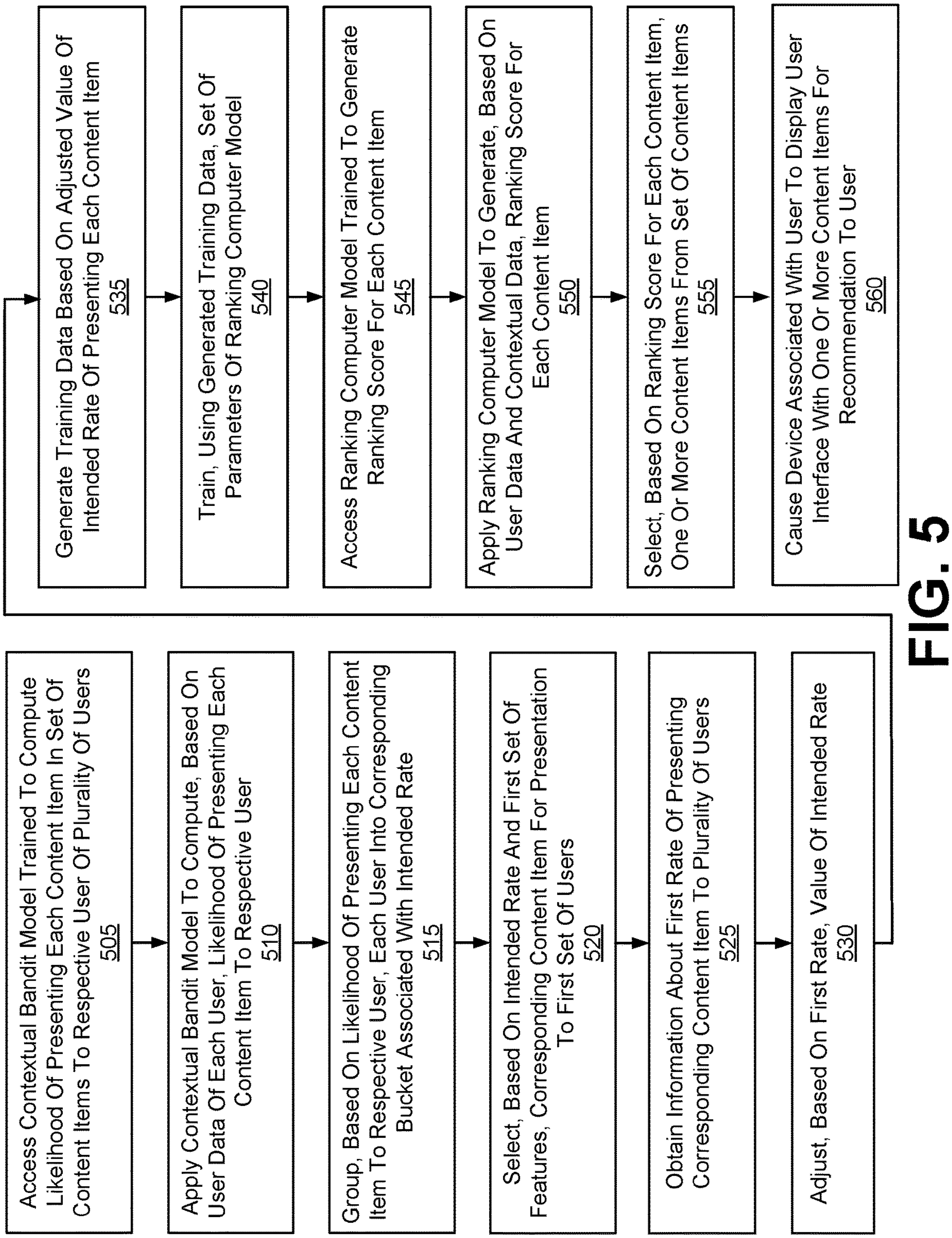
FIG. 5 is a flowchart for a method of training a computer model and using the trained computer model to select one or more content items for recommendation to a user of an online concierge system, in accordance with one or more embodiments.

FIG. 5 is a flowchart for a method of training a computer model and using the trained computer model to select one or more content items for recommendation to a user of an online concierge system, in accordance with one or more embodiments. Alternative embodiments may include more, fewer, or different steps from those illustrated in FIG. 5, and the steps may be performed in a different order from that illustrated in FIG. 5. These steps may be performed by an online concierge system (e.g., the online concierge system 140). Additionally, each of these steps may be performed automatically by the online concierge system without human intervention.

The online concierge system 140 accesses 505 a contextual bandit computer model of the online concierge system 140 (e.g., via the rate computation module 250), wherein the contextual bandit computer model is trained to compute a likelihood of presenting each content item in a set of content items to a respective user of a plurality of users of the online concierge system 140. The online concierge system 140 applies 510 the contextual bandit computer model (e.g., via the rate computation module 250) to compute, based at least in part on user data (e.g., shopping history over a defined time period as available at the data store 240) of each of the plurality of users, the likelihood of presenting each content item to the respective user.

The online concierge system 140 groups 515 (e.g., via the user grouping module 260), based at least in part on the likelihood of presenting each content item in the set of content items to the respective user, each of the plurality of users into a corresponding bucket of a plurality of buckets, the corresponding bucket being associated with an intended rate of presenting each content item in the set of content items to the plurality of users. The online concierge system 140 may group (e.g., via the user grouping module 260) each of the plurality of users into the respective bucket associated with the intended rate that is within a threshold difference from the computed likelihood. The online concierge system 140 selects 520 (e.g., via the user grouping module 260), based at least in part on the intended rate and a first set of features of the plurality of users, a corresponding content item from the set of content items for presentation to a first set of users of the plurality of users.

Upon presentation of the corresponding content item to the first set of users, the online concierge system 140 obtains 525 (e.g., at the rate adjustment module 270) information about a first rate of presenting the corresponding content item to the plurality of users. The online concierge system 140 adjusts 530 (e.g., via the rate adjustment module 270), based at least in part on the first rate, a value of the intended rate. The online concierge system 140 generates 535 (e.g., via the machine-learning training module 230), based at least in part on the adjusted value of the intended rate of presenting each content item in the set of content items to the plurality of users, training data for a ranking computer model of the online system. The online concierge system 140 trains 540 (e.g., via the machine-learning training module 230), using the generated training data, a set of parameters of the ranking computer model. The online concierge system 140 may store (e.g., via the ranking module 280) the set of parameters for the ranking computer model to a computer-readable medium of the online concierge system 140 (e.g., to a computer-readable medium of the data store 240 and/or a computer-readable medium of the ranking module 280).

The online concierge system 140 may select (e.g., via the user grouping module 260), based at least in part on the adjusted value of the intended rate and a second set of features of the plurality of users, the corresponding content item from the set of content items for presentation to a second set of users of the plurality of users. The first set of features and the second set of features of the plurality of users may dynamically change over time, thus affecting rates of selecting the corresponding content item for presentation. Upon presentation of the corresponding content item to the second set of users, the online concierge system 140 may obtain (e.g., at the rate adjustment module 270) information about a second rate of presenting the corresponding content item to the plurality of users. The online concierge system 140 may identify (e.g., via the rate adjustment module 270) that a difference between the second rate and the intended rate is below a threshold value. Responsive to the difference being below the threshold value, the online concierge system 140 may collect (e.g., via the machine-learning training module 230) feedback data with information about engagement of each user of the plurality of users in relation to each content item in the set of content items presented to one or more users of the plurality of users. Based on the collected feedback data, the online concierge system 140 may generate (e.g., via the machine-learning training module 230) at least a portion of the training data used for training the set of parameters of the ranking computer model.

In one or more embodiments, the online concierge system 140 iteratively adjusts (e.g., via the rate adjustment module 270) a value of the intended rate until a difference between a rate of presenting the corresponding content item to the plurality of users and the intended rate is below a threshold value, wherein the adjusted value of the intended rate is used for selecting the corresponding content item for presentation to one or more users of the plurality of users. The online concierge system 140 may generate (e.g., via the machine-learning training module 230), based at least in part on the adjusted value of the intended rate, the training data.

The online concierge system 140 accesses 545 the ranking computer model (e.g., via the ranking module 280), wherein the ranking computer model is trained to generate a ranking score for each content item in the set of content items. The online concierge system 140 applies 550 the ranking computer model (e.g., via the ranking module 280) to generate, based at least in part on user data for a user of the online concierge system 140 and contextual data associated with a current session of the user, the ranking score for each content item in the set of content items.

The online concierge system 140 may apply (e.g., via the ranking module 280) the ranking computer model to generate, further based on information about the set of content items, the ranking score for each content item in the set of content items. The online concierge system 140 may further apply (e.g., via the ranking module 280) the ranking computer model to generate, based at least in part on conversion data for the user over a defined time period, the ranking score for each content item in the set of content items. The online concierge system 140 may further apply (e.g., via the ranking module 280) the ranking computer model to generate, further based on information about at least one of a set of items or one or more content items the user interacted with during the current session, the ranking score for each content item in the set of content items.

The online concierge system 140 selects 555 (e.g., via the ranking module 280), based on the ranking score for each content item in the set of content items, one or more content items from the set of the content items. The online concierge system 140 causes 560 (e.g., via the content presentation module 210) a device associated with the user (e.g., the user client device) to display a user interface with the one or more content items for recommendation to the user.

The online concierge system 140 may collect (e.g., via the machine-learning training module 230) feedback data with information about an engagement by the user in relation to each of the one or more content items. The engagement may include, e.g., viewing any of the one or more content items, converting any of the one or more content items, sharing any of the one or more content items to one or more other users of the online concierge system 140, or some other type of interaction with the one or more content items. The online concierge system 140 may re-train the ranking computer model by updating (e.g., via the machine-learning training module 230), based at least in part on the collected feedback data, the set of parameters of the ranking computer model.

Embodiments of the present disclosure are directed to the online concierge system 140 that utilizes a trained computer model to select one or more content items for recommendation to a specific user of the online concierge system 140. The computer model is trained by grouping a collection of users into different buckets based on their intended rates for presenting a set of content items to the collection of users, and adjusting rates of presenting the content items until actual rates of serving the content items approach the intended rates within a threshold difference. In this manner, the computer model is trained to accurately evaluate selection of content items for presentation to individual users by taking into account any real time variation in relation to eligibility criteria for the user to receive the content items.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

accessing a contextual bandit model, wherein the contextual bandit model is a machine-learning model trained to compute a likelihood of presenting each content item in a set of content items to a respective user of a plurality of users of an online system;

applying the contextual bandit model to user data for each of the plurality of users to generate the likelihood of presenting each content item to the respective user;

grouping, based at least in part on the likelihood of presenting each content item in the set of content items to the respective user, each of the plurality of users into a corresponding bucket of a plurality of buckets, the corresponding bucket being associated with target rate of presenting each content item in the set of content items to the plurality of users;

selecting, based at least in part on the target rate and a first set of features of the plurality of users, a corresponding content item from the set of content items for presentation to a first set of users of the plurality of users;

upon presentation of the corresponding content item to the first set of users, obtaining information about a first rate of presenting the corresponding content item to the plurality of users;

adjusting, based at least in part on the first rate, a value of the target rate;

generating, based at least in part on the adjusted value of the target rate of presenting each content item in the set of content items to the plurality of users, training data for a ranking model;

training, using the generated training data, a set of parameters of the ranking model;

accessing the ranking model, wherein the ranking model is a machine-learning model trained to generate a ranking score for each content item in the set of content items;

applying the ranking model to user data for a user of the online system and contextual data associated with a current session of the user to generate the ranking score for each content item in the set of content items;

selecting, based on the ranking score for each content item in the set of content items, one or more content items from the set of content items; and causing a device associated with the user to display a user interface with the one or more content items for recommendation to the user, wherein an actual rate of presenting each of the one or more content items is within a threshold difference from the target rate of presenting each of the one or more content items due to training of the set of parameters of the ranking model using the generated training data.

2. The method of claim 1, wherein generating the training data further comprises:

selecting, based at least in part on the adjusted value of the target rate and a second set of features of the plurality of users, the corresponding content item from the set of content items for presentation to a second set of users of the plurality of users;

upon presentation of the corresponding content item to the second set of users, obtaining information about a second rate of presenting the corresponding content item to the plurality of users;

identifying that a difference between the second rate and the target rate is below a threshold value;

responsive to the difference being below the threshold value, collecting feedback data with information about engagement of each user of the plurality of users in relation to each content item in the set of content items presented to one or more users of the plurality of users; and generating, based on the collected feedback data, at least a portion of the training data used for training the set of parameters of the ranking model.

3. The method of claim 2, wherein the first set of features and the second set of features dynamically change over time affecting rates of selecting the corresponding content item for presentation.

4. The method of claim 1, wherein generating the training data further comprises:

iteratively adjusting a value of the target rate until a difference between a rate of presenting the corresponding content item to the plurality of users and the target rate is below a threshold value, the adjusted value of the target rate used for selecting the corresponding content item for presentation to one or more users of the plurality of users; and generating, based at least in part on the adjusted value of the target rate, the training data.

5. The method of claim 1, wherein grouping each of the plurality of users into the corresponding bucket comprises:

grouping each of the plurality of users into the corresponding bucket associated with the target rate that is within a threshold difference from the computed likelihood.

6. The method of claim 1, wherein applying the ranking model further comprises:

applying the ranking model further to information about the set of content items to generate the ranking score for each content item in the set of content items.

7. The method of claim 1, wherein applying the ranking model further comprises:

applying the ranking model further to conversion data for the user over a defined time period to generate the ranking score for each content item in the set of content items.

8. The method of claim 7, wherein applying the ranking model further comprises:

applying the ranking model further to information about at least one of a set of items or one or more content items the user interacted with during the current session to generate the ranking score for each content item in the set of content items.

9. A computer program product comprising a non-transitory computer readable storage medium having instructions encoded thereon that, when executed by a processor, cause the processor to perform steps comprising:

accessing a contextual bandit model, wherein the contextual bandit model is a machine-learning model trained to compute a likelihood of presenting each content item in a set of content items to a respective user of a plurality of users of an online system;

applying the contextual bandit model to user data for each of the plurality of users to generate the likelihood of presenting each content item to the respective user;

grouping, based at least in part on the likelihood of presenting each content item in the set of content items to the respective user, each of the plurality of users into a corresponding bucket of a plurality of buckets, the corresponding bucket being associated with target rate of presenting each content item in the set of content items to the plurality of users;

selecting, based at least in part on the target rate and a first set of features of the plurality of users, a corresponding content item from the set of content items for presentation to a first set of users of the plurality of users;

upon presentation of the corresponding content item to the first set of users, obtaining information about a first rate of presenting the corresponding content item to the plurality of users;

adjusting, based at least in part on the first rate, a value of the target rate;

generating, based at least in part on the adjusted value of the target rate of presenting each content item in the set of content items to the plurality of users, training data for a ranking model;

training, using the generated training data, a set of parameters of the ranking model;

accessing the ranking model, wherein the ranking model is a machine-learning model trained to generate a ranking score for each content item in the set of content items;

applying the ranking model to user data for a user of the online system and contextual data associated with a current session of the user to generate the ranking score for each content item in the set of content items;

selecting, based on the ranking score for each content item in the set of content items, one or more content items from the set of content items; and causing a device associated with the user to display a user interface with the one or more content items for recommendation to the user, wherein an actual rate of presenting each of the one or more content items is within a threshold difference from the target rate of presenting each of the one or more content items due to training of the set of parameters of the ranking model using the generated training data.

10. The computer program product of claim 9, wherein the instructions further cause the processor to perform steps comprising:

selecting, based at least in part on the adjusted value of the target rate and a second set of features of the plurality of users, the corresponding content item from the set of content items for presentation to a second set of users of the plurality of users;

upon presentation of the corresponding content item to the second set of users, obtaining information about a second rate of presenting the corresponding content item to the plurality of users;

identifying that a difference between the second rate and the target rate is below a threshold value;

responsive to the difference being below the threshold value, collecting feedback data with information about engagement of each user of the plurality of users in relation to each content item in the set of content items presented to one or more users of the plurality of users; and generating, based on the collected feedback data, at least a portion of the training data used for training the set of parameters of the ranking model.

11. The computer program product of claim 10, wherein the first set of features and the second set of features dynamically change over time affecting rates of selecting the corresponding content item for presentation.

12. The computer program product of claim 9, wherein the instructions further cause the processor to perform steps comprising:

iteratively adjusting a value of the target rate until a difference between a rate of presenting the corresponding content item to the plurality of users and the target rate is below a threshold value, the adjusted value of the target rate used for selecting the corresponding content item for presentation to one or more users of the plurality of users; and generating, based at least in part the adjusted value of the target rate, the training data.

13. The computer program product of claim 9, wherein the instructions further cause the processor to perform steps comprising:

grouping each of the plurality of users into the corresponding bucket associated with the target rate that is within a threshold difference from the computed likelihood.

14. The computer program product of claim 9, wherein the instructions further cause the processor to perform steps comprising:

accessing the ranking model, wherein the ranking model is a machine-learning model trained to generate a ranking score for each content item in the set of content items;

applying the ranking model to user data for a user of the online system and contextual data associated with a current session of the user to generate the ranking score for each content item in the set of content items;

selecting, based on the ranking score for each content item in the set of content items, the one or more content items from the set of content items; and causing the device associated with the user to display the user interface with the one or more content items for recommendation to the user.

15. The computer program product of claim 14, wherein the instructions further cause the processor to perform steps comprising:

applying the ranking model further to information about the set of content items to generate the ranking score for each content item in the set of content items.

16. The computer program product of claim 14, wherein the instructions further cause the processor to perform steps comprising:

applying the ranking model further to conversion data for the user over a defined time period to generate the ranking score for each content item in the set of content items.

17. The computer program product of claim 16, wherein the instructions further cause the processor to perform steps comprising:

applying the ranking model further to information about at least one of a set of items or one or more content items the user interacted with during the current session to generate the ranking score for each content item in the set of content items.

18. A computer system comprising:

a processor; and a non-transitory computer-readable storage medium having instructions that, when executed by the processor, cause the computer system to perform steps comprising:

accessing a contextual bandit model, wherein the contextual bandit model is a machine-learning model trained to compute a likelihood of presenting each content item in a set of content items to a respective user of a plurality of users of an online system;

applying the contextual bandit model to user data for each of the plurality of users to generate the likelihood of presenting each content item to the respective user;

grouping, based at least in part on the likelihood of presenting each content item in the set of content items to the respective user, each of the plurality of users into a corresponding bucket of a plurality of buckets, the corresponding bucket being associated with target rate of presenting each content item in the set of content items to the plurality of users;

selecting, based at least in part on the target rate and a first set of features of the plurality of users, a corresponding content item from the set of content items for presentation to a first set of users of the plurality of users;

upon presentation of the corresponding content item to the first set of users, obtaining information about a first rate of presenting the corresponding content item to the plurality of users;

adjusting, based at least in part on the first rate, a value of the target rate;

generating, based at least in part on the adjusted value of the target rate of presenting each content item in the set of content items to the plurality of users, training data for a ranking model;

training, using the generated training data, a set of parameters of the ranking model;

accessing the ranking model, wherein the ranking model is a machine-learning model trained to generate a ranking score for each content item in the set of content items;

applying the ranking model to user data for a user of the online system and contextual data associated with a current session of the user to generate the ranking score for each content item in the set of content items;

selecting, based on the ranking score for each content item in the set of content items, one or more content items from the set of content items; and causing a device associated with the user to display a user interface with the one or more content items for recommendation to the user, wherein an actual rate of presenting each of the one or more content items is within a threshold difference from the target rate of presenting each of the one or more content items due to training of the set of parameters of the ranking model using the generated training data.

* * * * *